US012811417B2

(12) United States Patent
Li et al.

(10) Patent No.: US 12,811,417 B2
(45) Date of Patent: Nov. 24, 2026

(54) CHARGING PORT PROTECTION APPARATUS AND TERMINAL

(71) Applicant: Huawei Technologies Co., Ltd., Shenzhen (CN)

(72) Inventors: Xiaoyun Li, Shenzhen (CN); Hui Cheng, Dongguan (CN); Zhi Xiao, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1071 days.

(21) Appl. No.: 17/793,893

(22) PCT Filed: Jan. 20, 2021

(86) PCT No.: PCT/CN2021/072894
§ 371 (c)(1),
(2) Date: Jul. 19, 2022

(87) PCT Pub. No.: WO2021/147907
PCT Pub. Date: Jul. 29, 2021

(65) Prior Publication Data

US 2023/0055714 A1 Feb. 23, 2023

(30) Foreign Application Priority Data

Jan. 21, 2020 (CN) ......................... 202010071301.9

(51) Int. Cl.
*H02J 7/60* (2026.01)
*H02H 9/04* (2006.01)
(Continued)

(52) U.S. Cl.
CPC ............... *H02J 7/60* (2026.01); *H02H 9/045* (2013.01); *H02J 7/80* (2026.01); *H02J 7/933* (2026.01)

(58) Field of Classification Search
CPC .... H02J 7/60; H02J 7/80; H02J 7/933; H02H 9/045; H02H 3/05; H02H 7/18;
(Continued)

(56) References Cited

U.S. PATENT DOCUMENTS 3,454,860 A 7/1969 Burkett et al.
3,708,738 A 1/1973 Crawford et al.
(Continued)

FOREIGN PATENT DOCUMENTS

CN 101346865 A 1/2009
CN 202405762 U * 8/2012 ............. H02H 3/202
(Continued)

OTHER PUBLICATIONS

Li et al., "A Novel Low-Leakage ESD Power-Rail Clamp Circuit," Microelectronics, vol. 46, No. 4, Total 4 pages (Aug. 2016). With an English Abstract.

(Continued)

*Primary Examiner* — Dharti H Patel
(74) *Attorney, Agent, or Firm* — Leydig, Voit & Mayer, Ltd.

(57) ABSTRACT

A charging port protection apparatus and a terminal related to the field of terminal technologies are provided, including a first detection circuit, a first discharge circuit, a second detection voltage, and a switch circuit. The first detection circuit generates a first detection voltage based on a peak voltage of an input voltage. The first discharge circuit discharges the peak voltage based on the first detection voltage. The second detection circuit generates a second detection voltage when the input voltage is greater than a first threshold. The switch circuit disconnects the input voltage based on the second detection voltage. This implements not only protection against an ESD and EOS peak voltage, but also protection against a high-voltage direct
(Continued)

current. The protection against the peak voltage and the protection against the high-voltage direct current are not mutually limited, which implements protection against impact of electrical over-stress in various forms.

6 Claims, 7 Drawing Sheets

(51) Int. Cl.
*H02J 7/80* (2026.01)
*H02J 7/90* (2026.01)

(58) Field of Classification Search
CPC .......... H02H 3/20; H02H 3/202; H02H 9/042; H02H 9/046; H02H 9/041; G01R 19/0084
See application file for complete search history.

(56) References Cited

U.S. PATENT DOCUMENTS

| | | | | |
|---|---|---|---|---|
| 4,415,943 | A * | 11/1983 | Wortman | H02H 7/08 361/33 |
| 4,716,372 | A * | 12/1987 | Fauser | G01R 19/16571 327/392 |
| 6,816,348 | B2 * | 11/2004 | Chen | H02H 11/002 361/91.1 |
| 7,751,157 | B2 * | 7/2010 | Migliavacca | G05F 1/571 361/91.1 |
| 10,109,998 | B2 * | 10/2018 | Altaras | H02H 9/04 |
| 10,177,137 | B1 * | 1/2019 | Altolaguirre | H10D 89/611 |
| 10,840,237 | B2 | 11/2020 | Tsai et al. | |
| 11,749,674 | B2 * | 9/2023 | Li | H10D 89/811 361/56 |
| 11,791,624 | B2 * | 10/2023 | Fang | H02H 9/046 361/56 |
| 2002/0181177 | A1 * | 12/2002 | Ker | H10D 89/601 361/56 |
| 2003/0076636 | A1 | 4/2003 | Ker et al. | |
| 2006/0215344 | A1 * | 9/2006 | Choi | H10D 89/611 361/112 |
| 2008/0186644 | A1 * | 8/2008 | Migliavacca | G05F 1/571 361/86 |
| 2008/0239599 | A1 * | 10/2008 | Yizraeli | H02H 9/046 361/56 |
| 2008/0266739 | A1 * | 10/2008 | Migliavacca | G05F 1/571 361/91.1 |
| 2008/0316660 | A1 * | 12/2008 | Huang | H02H 9/046 361/56 |
| 2009/0091872 | A1 * | 4/2009 | Ueda | H02H 3/20 361/91.1 |
| 2009/0168280 | A1 * | 7/2009 | Huang | H02H 9/046 361/56 |
| 2009/0237846 | A1 * | 9/2009 | Lin | H02H 9/046 257/E21.616 |
| 2010/0033884 | A1 | 2/2010 | Fan et al. | |
| 2010/0238599 | A1 * | 9/2010 | Liang | H03K 19/00315 361/56 |
| 2011/0063762 | A1 * | 3/2011 | Lee | H02H 9/046 361/56 |
| 2013/0075798 | A1 | 3/2013 | Kato | |
| 2014/0368958 | A1 | 12/2014 | Ikimura | |
| 2016/0033984 | A1 * | 2/2016 | Lee | G05F 1/575 323/280 |
| 2018/0083441 | A1 * | 3/2018 | Natarajan | H02H 1/0061 |
| 2018/0374839 | A1 | 12/2018 | Tsai et al. | |
| 2019/0006841 | A1 | 1/2019 | Singh | |
| 2019/0096874 | A1 * | 3/2019 | Rajagopal | H02H 3/20 |
| 2019/0164953 | A1 | 5/2019 | Taghizadeh Kaschani | |
| 2019/0165571 | A1 * | 5/2019 | Batra | H02H 9/046 |
| 2019/0173278 | A1 * | 6/2019 | Jang | H02H 9/046 |
| 2020/0083704 | A1 * | 3/2020 | Huang | H02H 1/0007 |
| 2021/0083471 | A1 * | 3/2021 | Watanabe | H02H 7/122 |
| 2022/0294212 | A1 * | 9/2022 | Peng | H02H 1/0007 |
| 2023/0009631 | A1 * | 1/2023 | Zhu | H02H 9/046 |
| 2023/0055714 | A1 * | 2/2023 | Li | H02H 3/20 |
| 2023/0198250 | A1 * | 6/2023 | Jou | H10D 89/811 361/56 |
| 2024/0332959 | A1 * | 10/2024 | Li | G11C 7/24 |
| 2025/0309639 | A1 * | 10/2025 | Chuang | H02H 1/0007 |

FOREIGN PATENT DOCUMENTS

| | | | | |
|---|---|---|---|---|
| CN | 103107528 | A | 5/2013 | |
| CN | 103401229 | A | 11/2013 | |
| CN | 104979881 | A | 10/2015 | |
| CN | 105226808 | A | 1/2016 | |
| CN | 107834531 | A | 3/2018 | |
| CN | 107979064 | A | 5/2018 | |
| CN | 207339253 | U | 5/2018 | |
| CN | 108306273 | A | 7/2018 | |
| CN | 109792147 | A | 5/2019 | |
| CN | 110365074 | A | 10/2019 | |
| CN | 218124292 | U * | 12/2022 | |
| JP | 2009148097 | A * | 7/2009 | H02H 3/202 |
| KR | 20020082400 | A | 10/2002 | |
| TW | I265623 | B | 11/2006 | |
| WO | 2014146268 | A1 | 9/2014 | |

OTHER PUBLICATIONS

Ker et al., "ESD Protection Design for Touch Panel Control IC Against Latchup-Like Failure Induced by System-Level ESD Test," IEEE Transactions on Electron Devices, vol. 64, No. 2, pp. 642-645, Institute of Electrical and Electronics Engineers, New York, New York (Feb. 2017).

Wang et al., "A Wafer-level Characterization Method of ESD Protection Circuits for Both Component-level and System-level Applications," 7th Asia Pacific International Symposium on Electromagnetic Compatibility, pp. 503-506, Institute of Electrical and Electronics Engineers, New York, New York (2016).

Zimmermann et al., "An Over-Voltage Protection Circuit for CMOS Power Amplifiers," 2008 15th IEEE International Conference on Electronics, Circuits and Systems, pp. 161-164, Institute of Electrical and Electronics Engineers, New York, New York (2008).

P. D'Abramo et al., "Power-Supply Overvoltage Protection Circuit for Motorcycle On-Board Electronics," 2001 Southwest Symposium on Mixed-Signal Design (Cat. No.01EX475), pp. 162-166, Institute of Electrical and Electronics Engineers, New York, New York (2001).

* cited by examiner

CHARGING PORT PROTECTION APPARATUS AND TERMINAL

CROSS-REFERENCE TO RELATED APPLICATIONS

This application is a national stage of International Application No. PCT/CN2021/072894, filed on Jan. 20, 2021, which claims priority to Chinese Patent Application No. 202010071301.9 filed on Jan. 21, 2020. Both of the aforementioned applications are hereby incorporated by reference in their entireties.

TECHNICAL FIELD

Embodiments of this application relate to the field of terminal technologies, and in particular, to a charging port protection apparatus and a terminal.

BACKGROUND

A charging port of a terminal device such as a mobile phone or a tablet is a peripheral interface, and receives impact from electrical over-stress in various forms in an application scenario, for example, electro-static discharge (ESD), electrical over stress (EOS), and a high-voltage direct current, which are all high-risk factors for port damage. Therefore, it is urgent to provide a charging port protection apparatus for protecting against the impact of electrical over-stress in various forms.

SUMMARY

Embodiments of this application provide a charging port protection apparatus and a terminal of the apparatus, to protect against impact of electrical over-stress in various forms.

This application is implemented as follows: An embodiment of this application provides a charging port protection apparatus, including:

- a first detection circuit, configured to generate a first detection voltage based on a peak voltage of an input voltage;
- a first discharge circuit, connected to the first detection circuit, and configured to discharge the peak voltage based on the first detection voltage;
- a second detection circuit, connected to the first detection circuit and the first discharge circuit, and configured to generate a second detection voltage when the input voltage is greater than a first threshold; and
- a switch circuit, connected to the first detection circuit, the first discharge circuit, and the second detection circuit, and configured to disconnect the input voltage based on the second detection voltage.

In a possible implementation, the first discharge circuit is an NMOS transistor.

For example, the NMOS transistor discharges the peak voltage based on the first detection voltage.

It should be understood that, it is merely an optional implementation that the first discharge circuit is an NMOS transistor, and a possible implementation includes that the first discharge circuit is an NMOS transistor or a PMOS transistor.

In an embodiment, the first detection circuit includes a first capacitor, a first resistor, and a first voltage-regulator diode.

A negative electrode of the first voltage-regulator diode is an input voltage input end of the first detection circuit. A positive electrode of the first voltage-regulator diode is connected to a first end of the first capacitor. A second end of the first capacitor and a first end of the first resistor are first detection voltage output ends of the first detection circuit. A second end of the first resistor is connected to a power ground.

In an embodiment, the second detection circuit includes:

- a first detection component, connected to the first detection circuit, the first discharge circuit, and the switch circuit, and configured to generate a third detection voltage when the input voltage is greater than the first threshold; and
- a first switch component, connected to the detection component, the first detection circuit, the first discharge circuit, and the switch circuit, and configured to generate the second detection voltage based on the third detection voltage.

In an embodiment, the first detection component includes a voltage-regulator diode assembly and a second resistor.

A first end of the second resistor is an input voltage input end of the first detection component. A second end of the second resistor and a negative electrode of the voltage-regulator diode assembly are third detection voltage output ends of the first detection component. A positive electrode of the voltage-regulator diode assembly is connected to a power ground.

In an embodiment, the first switch component includes a first field effect transistor and a third resistor.

A gate of the first field effect transistor is a third detection voltage input end of the first switch component. A source of the first field effect transistor is an input voltage input end of the first switch component. A first end of the third resistor and a drain of the first field effect transistor jointly form a second detection voltage output end of the first switch component.

An embodiment of this application further provides a terminal, including the foregoing charging port protection apparatus.

This application may be further implemented as follows: An embodiment of this application provides a charging port protection apparatus, including:

- a third detection circuit, configured to generate a fourth detection voltage when electrical over-stress of an input voltage is greater than a second threshold, or generate the fourth detection voltage based on a feedback voltage; and
- a second discharge circuit, connected to the third detection circuit, and configured to discharge the electrical over-stress of the input voltage based on the fourth detection voltage, and generate the feedback voltage based on the discharge of the electrical over-stress.

In a possible implementation, the second discharge circuit includes a switch transistor and an impedor that is connected to an output end of the switch transistor. The impedor may be a field effect transistor.

For example, the switch transistor discharges the electrical over-stress of the input voltage based on the fourth detection voltage to protect a functional chip, and the impedor generates the feedback voltage based on the discharge of the electrical over-stress.

It should be understood that, it is merely an optional implementation that the impedor may be a field effect transistor, and a possible implementation includes that the impedor may be a field effect transistor or a resistor.

In an embodiment, the second discharge circuit includes the switch transistor and the impedor.

A control end of the switch transistor is a third detection voltage input end of the second discharge circuit. An input end of the switch transistor is an input voltage input end of the second discharge circuit. An output end of the switch transistor and a first end of the impedor jointly form a feedback voltage output end of the second discharge circuit. A second end of the impedor is connected to a power ground.

In an embodiment, the switch transistor is a second field effect transistor, and the impedor is a third field effect transistor or a fourth resistor.

In an embodiment, the third detection circuit includes:

a second detection component, connected to the second discharge circuit, and configured to generate a fifth detection voltage when the electrical over-stress of the input voltage is greater than the second threshold;

a follower, connected to the second detection component and the second discharge circuit, and configured to follow the fifth detection voltage and a first voltage to generate the fourth detection voltage; and a feedback circuit, connected to the second discharge circuit, the second detection component, and the follower, and configured to connect the first voltage based on the feedback voltage.

In an embodiment, the feedback circuit includes:

a first inverter, connected to the second discharge circuit, and configured to invert a phase of the feedback voltage; and a second switch component, connected to the second detection component, the first inverter, and the follower, and configured to connect the first voltage based on the phase-inverted feedback voltage.

In an embodiment, the second detection component includes a second voltage-regulator diode, a fifth resistor, and a sixth resistor.

A negative electrode of the second voltage-regulator diode is an input voltage input end of the second detection component. A positive electrode of the second voltage-regulator diode is connected to a first end of the fifth resistor. A second end of the fifth resistor and a first end of the sixth resistor jointly form a fifth detection voltage output end of the second detection component. A second end of the sixth resistor is connected to a power ground.

In an embodiment, the first inverter includes a fourth field effect transistor and a seventh resistor.

A gate of the fourth field effect transistor is a feedback voltage input end of the first inverter. A source of the fourth field effect transistor is connected to a second power supply. A drain of the fourth field effect transistor and a first end of the seventh resistor jointly form an output end of the first inverter. A second end of the seventh resistor is connected to a power ground.

In an embodiment, the second switch component includes a fifth field effect transistor.

A gate of the fifth field effect transistor is a feedback voltage input end of the second switch component. A source of the fifth field effect transistor inputs the first voltage. A drain of the fifth field effect transistor is a first voltage output end of the second switch component.

An embodiment of this application further provides a terminal, including the foregoing charging port protection apparatus.

In embodiments of this application, a first detection circuit, a first discharge circuit, a second detection voltage, and a switch circuit are included. The first detection circuit generates a first detection voltage based on a peak voltage of an input voltage. The first discharge circuit discharges the peak voltage based on the first detection voltage. The second detection circuit generates a second detection voltage when the input voltage is greater than a first threshold. The switch circuit disconnects the input voltage based on the second detection voltage to protect a functional chip. This implements not only protection against an ESD and EOS peak voltage, but also protection against a high-voltage direct current. The protection against the peak voltage and the protection against the high-voltage direct current are not mutually limited, which implements protection against impact of electrical over-stress in various forms, and improves reliability of the charging port protection apparatus.

DESCRIPTION OF EMBODIMENTS

Figure 1:
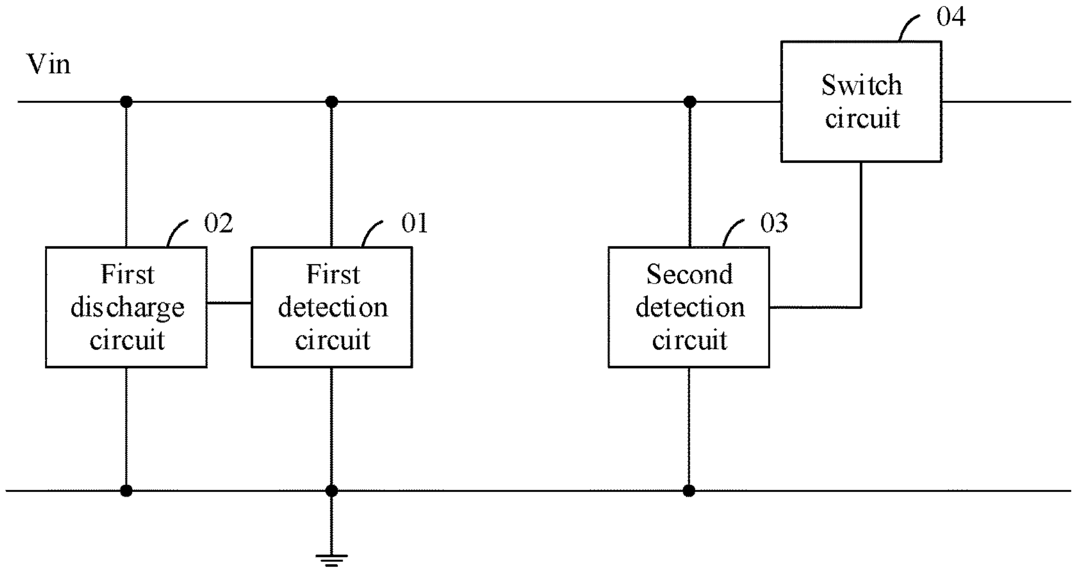
FIG. 1 is a schematic module diagram of a charging port protection apparatus according to Embodiment 1 of this application.

In the following descriptions, to illustrate rather than limit, specific details such as a particular system structure and a technology are provided to make a thorough understanding of embodiments of this application. However, persons skilled in the art should know that this application may also be implemented in other embodiments without these specific details. In other cases, detailed descriptions of well-known systems, apparatuses, circuits, and methods are omitted, so that this application is described without being obscured by unnecessary details.

It should be understood that, when used in the specification and claims of this application, the term “include” indicates presence of described features, entireties, steps, operations, elements, and/or components, but does not exclude presence or addition of one or more other features, entireties, steps, operations, elements, components, and/or collections thereof.

It should be further understood that the term “and/or” used in the specification and claims of this application indicates any combination and all possible combinations of one or more items listed in association, and includes the combinations.

As used in the specification and claims of this application, the term "if" may be interpreted as "when", "once", "in response to determining", or "in response to detecting" depending on the context. Similarly, the phrase "if it is determined" or "if the [described condition or event] is detected" may be interpreted as a meaning of "once determined" or "in response to determining" or "once the [described condition or event] is detected" or "in response to detecting the [described condition or event]" depending on the context.

In addition, in the descriptions of the specification and claims of this application, the terms "first", "second", "third", and the like are merely intended for a purpose of differentiated description, but shall not be understood as an indication or an implication of relative importance.

Referring to "an embodiment" or "some embodiments" or the like in the specification of this application means that one or more embodiments of this application include a specific feature, structure, or characteristic described with reference to the embodiment. Therefore, statements such as "in an embodiment", "in some embodiments", "in some other embodiments", and "in other embodiments" that appear at different places in this specification do not necessarily mean referring to a same embodiment, instead, they mean "one or more but not all of the embodiments", unless otherwise specifically emphasized. The terms "include", "contain", "have", and their variants all mean "include but are not limited to", unless otherwise specifically emphasized in other ways.

A charging port protection apparatus provided in embodiments of this application may be applied to a terminal device such as a mobile phone, a tablet computer, a wearable device, a vehicle-mounted device, an augmented reality (AR) device/a virtual reality (VR) device, a notebook computer, an ultra-mobile personal computer (UMPC), a netbook, or a personal digital assistant (PDA). A specific type of the terminal device is not limited in embodiments of this application.

For example, the terminal device may be a station (ST) in a WLAN, and may be a cellular phone, a cordless phone, a session initiation protocol (SIP) phone, a wireless local loop (WLL) station, a personal digital assistant (PDA) device, a handheld device with a wireless communication function, a computing device or another processing device connected to a wireless modem, a vehicle-mounted device, an terminal in an Internet of Vehicles, a computer, a laptop computer, a handheld communication device, a handheld computing device, a satellite wireless device, a wireless modem card, a television set-top box (STB), customer premise equipment (CPE) and/or another device and a next-generation communication system for communicating over a wireless system, for example, a mobile terminal in a 5G network, or a mobile terminal in a future evolved public land mobile network (PLMN).

By way of example, and not limitation, when the terminal device is a wearable device, the wearable device may alternatively be a generic term for wearable devices such as glasses, gloves, watches, clothes, and shoes that are developed based on intelligent design of daily wearing by using wearable technologies. The wearable device is a portable device that can be directly worn on a body or integrated into clothes or an accessory of a user. The wearable device is not only a hardware device, but is used to implement powerful functions through software support, data exchange, and cloud interaction. In a broad sense, the wearable intelligent device includes a device that provides a complete function, has a large size, and can implement all or some functions without relying on a smartphone, for example, a smart watch or smart glasses; and includes a device that focuses only on a specific type of application and needs to be used in combination with another device such as a smartphone, for example, various smart bands and smart jewelry used for vital sign monitoring.

It should be understood that a conventional charging port protection apparatus includes a transient voltage suppressor (TVS), over voltage protection (OVP), and a TVS and OVP joint protection solution.

When a TVS device is used, although the TVS has a fast startup speed and can protect against a transient high-voltage pulse, such as ESD and a surge, the TVS is easily damaged in a high-voltage direct current. However, a specially manufactured TVS device that has a high-voltage direct current protection capability has a startup overvoltage, and it is difficult to implement a function of protecting an internal functional chip.

When an OVP device is used, although the OVP can protect against impact of high-voltage direct current on the functional chip at a charging port, the OVP device has a slow startup speed. Under the transient high-voltage pulse, such as an ESD pulse and an EOS pulse, because the OVP device cannot be started in time, the functional chip connected to the charging port is easily damaged.

When the TVS and OVP joint protection solution is used, if the TVS device is started before the OVP device, the TVS device is first damaged by the high-voltage direct current. Alternatively, if the OVP device is started before the TVS device, the OVP device is damaged by the transient ESD or EOS high-voltage pulse. Therefore, protection performance of the TVS and protection performance of the OVP are mutually limited. This solution not only increases an area of a protection circuit, but also does not resolve the impact of electrical over-stress on the charging port.

Therefore, a conventional charging port protection apparatus cannot protect against impact of electrical over-stress in various forms.

Embodiment 1

FIG. 1 shows a module structure of a charging port protection apparatus according to Embodiment 1 of the present invention, and for convenience of description, only a part related to Embodiment 1 of the present invention is shown. Specific descriptions are as follows:

The charging port protection apparatus includes a first detection circuit 01, a first discharge circuit 02, a second detection circuit 03, and a switch circuit 04.

The first detection circuit 01 is configured to generate a first detection voltage based on a peak voltage of an input voltage. The first discharge circuit 02 is connected to the first detection circuit 01, and is configured to discharge the peak voltage based on the first detection voltage. The second detection circuit 03 is connected to the first detection circuit 01 and the first discharge circuit 02, and is configured to generate a second detection voltage when the input voltage is greater than a first threshold. The switch circuit 04 is connected to the first detection circuit 01, the first discharge circuit 02, and the second detection circuit 03, and is configured to disconnect the input voltage based on the second detection voltage.

Specifically, the switch circuit 04 is further connected to a functional chip, and is specifically configured to disconnect the input voltage based on the second detection voltage to protect the functional chip.

It should be noted that, the first detection circuit 01 may be specifically configured to generate the first detection voltage when the peak voltage of the input voltage is greater than a preset peak voltage.

The first detection circuit generates the first detection voltage when the peak voltage of the input voltage is greater than the preset peak voltage, so that the first discharge circuit 02 is enabled only when the peak voltage is greater than the preset peak voltage. This improves stability of the charging port protection apparatus.

Figure 2:
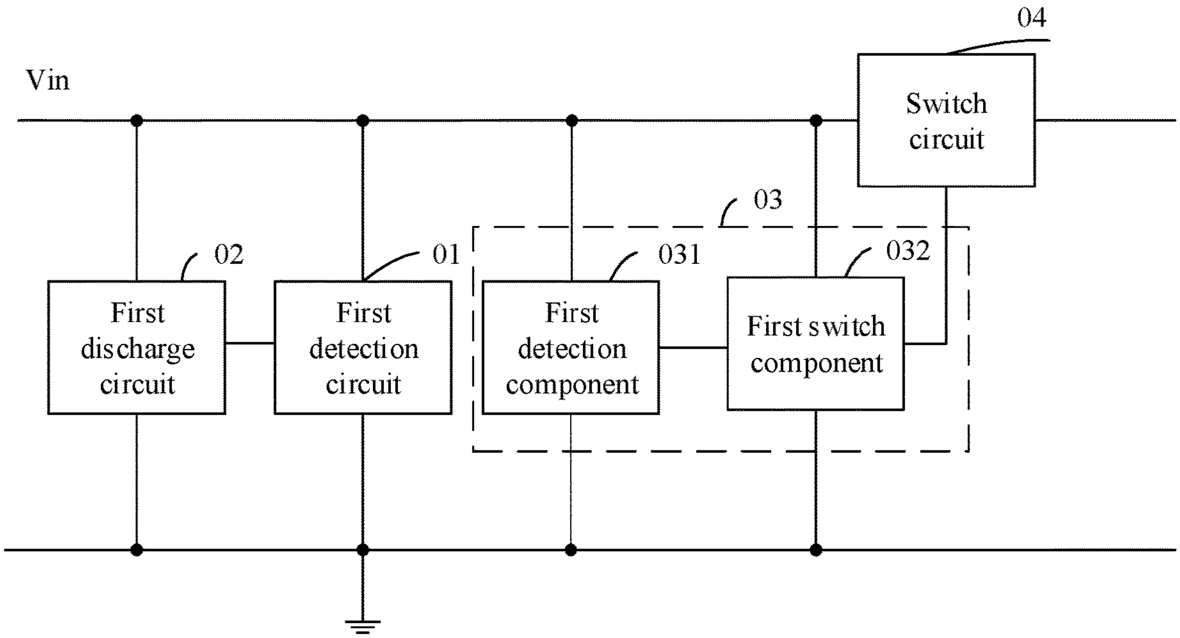
FIG. 2 is a schematic module diagram of a second detection circuit of a charging port protection apparatus according to Embodiment 1 of this application.

As shown in FIG. 2, the second detection circuit 03 includes a first detection component 031 and a first switch component 032.

The first detection component 031 is connected to the first detection circuit 01, the first discharge circuit 02, and the switch circuit 04, and is configured to generate a third detection voltage when the input voltage is greater than a first threshold. The first switch component 032 is connected to the detection component, the first detection circuit 01, the first discharge circuit 02, and the switch circuit 04, and is configured to generate the second detection voltage based on the third detection voltage.

The first switch component 032 generates the second detection voltage based on the third detection voltage, so that accuracy of the second detection voltage is improved, and reliability of the charging port protection apparatus is improved.

Figure 3:
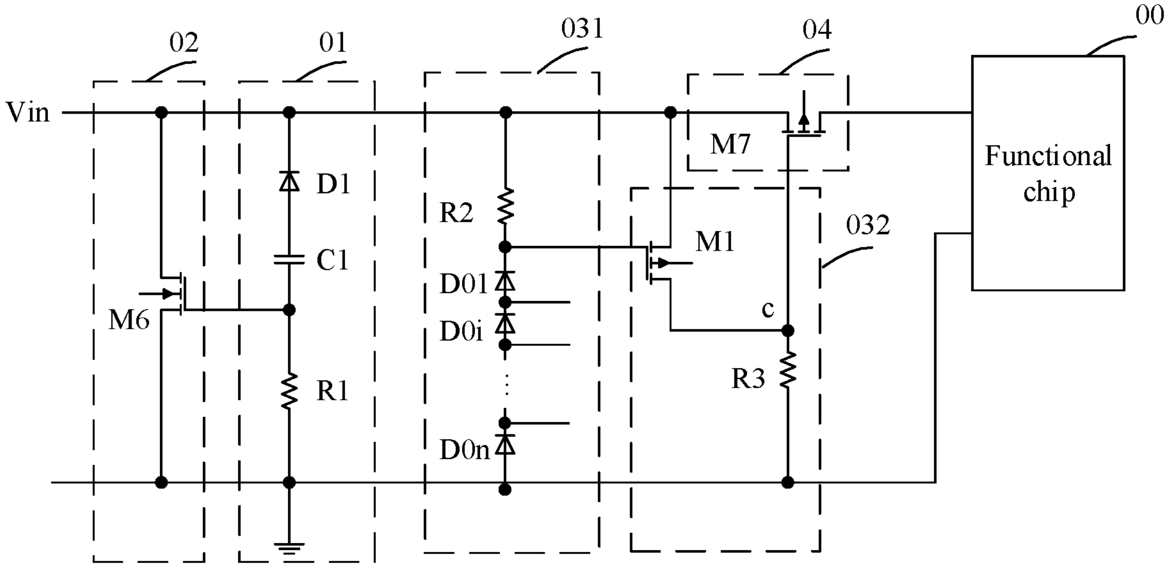
FIG. 3 is a diagram of an example circuit structure of a charging port protection apparatus according to Embodiment 1 of this application.

FIG. 3 shows an example circuit structure of a charging port protection apparatus according to an embodiment of the present invention, and for convenience of description, only a part related to the embodiment of the present invention is shown. Specific descriptions are as follows:

The first discharge circuit 02 includes a sixth field effect transistor M6. A gate of the sixth field effect transistor M6 is a first detection voltage input end of the first discharge circuit 02. A drain of the sixth field effect transistor M6 is a peak voltage input end of the first discharge circuit 02. A source of the sixth field effect transistor M6 is a peak voltage output end of the first discharge circuit 02.

By way of example, and not limitation, the sixth field effect transistor M6 is an NMOS transistor, and therefore has a strong capability of discharging a high current.

The first detection circuit 01 includes a first capacitor C1, a first resistor R1, and a first voltage-regulator diode D1.

A negative electrode of the first voltage-regulator diode D1 is an input voltage input end of the first detection circuit 01. A positive electrode of the first voltage-regulator diode D1 is connected to a first end of the first capacitor C1. A second end of the first capacitor C1 and a first end of the first resistor R1 are first detection voltage output ends of the first detection circuit 01. A second end of the first resistor R1 is connected to a power ground.

The first detection circuit 01 includes the first voltage-regulator diode D1, so that an RC circuit formed by the first capacitor C1 and the first resistor R1 is enabled only when the peak voltage is greater than a clamping voltage of the first voltage-regulator diode D1. This prevents current overshoot during proper insertion and removal.

The first detection component 031 includes a voltage-regulator diode assembly and a second resistor R2.

A first end of the second resistor R2 is an input voltage input end of the first detection component 031. A second end of the second resistor R2 and a negative electrode of the voltage-regulator diode assembly are third detection voltage output ends of the first detection component 031. A positive electrode of the voltage-regulator diode assembly is connected to the power ground.

The voltage-regulator diode assembly includes n voltage-regulator diodes. A $1^{st}$ voltage-regulator diode D01 to an $n^{th}$ voltage-regulator diode D0*n* are sequentially connected in series. A positive electrode of an $i^{th}$ voltage-regulator diode D0*i* and a negative electrode of an $(i+1)^{th}$ voltage-regulator diode D0*i*+1 jointly form an $i^{th}$ adjustment voltage input end of the first detection component 031. n is an integer greater than 1, and i is greater than or equal to 1 and less than n.

The first switch component 032 includes a first field effect transistor M1 and a third resistor R3.

A gate of the first field effect transistor M1 is a third detection voltage input end of the first switch component 032. A source of the first field effect transistor M1 is an input voltage input end of the first switch component 032. A first end of the third resistor R3 and a drain of the first field effect transistor M1 jointly form a second detection voltage output end of the first switch component 032.

The switch circuit 04 includes a seventh field effect transistor M7. A gate of the seventh field effect transistor M7 is a second detection voltage input end of the switch circuit 04. A source of the seventh field effect transistor M7 is an input voltage input end of the switch circuit 04. A drain of the seventh field effect transistor M7 is an input voltage output end of the switch circuit 04.

An embodiment of the present invention further provides a terminal, including the foregoing charging port protection apparatus.

What is shown in FIG. 3 is further described with reference to a working principle.

The seventh field effect transistor M7 may be a PMOS transistor. The PMOS transistor has a small series resistor, which improves transmission efficiency of the input voltage. The first field effect transistor M1 may also be a PMOS transistor.

The first voltage-regulator diode D1, the first capacitor C1, and the first resistor R1 generate a first detection voltage based on a peak voltage of the input voltage. The first voltage-regulator diode D1 is used to identify whether a peak voltage Vin of an input voltage of a charging port is higher than the clamping voltage of the first voltage-regulator diode, so that when the peak voltage Vin of the input voltage is less than the clamping voltage of the first voltage-regulator diode, the first voltage-regulator diode D1 is turned off, the gate of the sixth field effect transistor M6 is pulled down to the power ground by the first resistor R1, and the sixth field effect transistor M6 is cut off. When the peak voltage Vin of the input voltage is not less than the clamping voltage of the first voltage-regulator diode, the first voltage-regulator diode D1 is turned on. The first capacitor C1 and the first resistor R1 are used to control the sixth field effect transistor M6, so that the sixth field effect transistor M6 is turned on under the ESD and EOS pulses to clamp the input voltage of the charging port to a safety value, and remains turned off when the input voltage is a direct current voltage. A time constant of the first capacitor C1 and a time constant of the first resistor R1 may be 200 μs, and may be between an order of ms at a rising edge of the direct current voltage and an order of a few μs to tens of μs at a rising edge of the EOS.

The voltage-regulator diode assembly identifies whether the input voltage Vin of the voltage of the charging port is higher than the clamping voltage of the voltage-regulator diode assembly. When the input voltage Vin of the port voltage is less than the clamping voltage of the voltage-regulator diode assembly, the voltage-regulator diode assembly is turned off. In this case, the second resistor R2 is used as a pull-up resistor, so that a voltage at a gate end of the first field effect transistor M1 is the same as a voltage at a source end of the first field effect transistor M1. The first field effect transistor M1 remains in an off state, the gate of the seventh field effect transistor M7 is pulled down to the power ground by the third resistor R3, and a source end of the seventh field effect transistor M7 is connected to an input voltage. Therefore, the seventh field effect transistor M7 is in an on state, to transmit the input voltage Vin to a functional chip 00.

When the input voltage Vin is greater than the clamping voltage of the voltage-regulator diode assembly, the voltage-regulator diode assembly is turned on. Due to the current limiting function of the second resistor R2, the voltage-regulator diode assembly clamps a gate voltage Vg_p1 of the first field effect transistor M1 near the clamping voltage of the voltage-regulator diode assembly. There is a voltage difference between a source end of the first field effect transistor M1 and a gate end of the first field effect transistor M1. The first field effect transistor M1 charges a node c. When the voltage difference between the source end of the first field effect transistor M1 and the gate end of the first field effect transistor M1 is less than a turn-on voltage of the first field effect transistor M1, the first field effect transistor M1 is not completely turned on, and the seventh field effect transistor M7 is not completely turned off. However, in this case, because the series resistor of the first field effect transistor M1 becomes larger, a voltage transmitted to a port of the functional chip 00 is less than a voltage value of the input voltage Vin. This plays a protection role to an extent.

When the voltage difference between the source of the first field effect transistor M1 and the gate of the first field effect transistor M1 is far greater than the turn-on voltage of the first field effect transistor M1, the first field effect transistor M1 is completely turned on, and a source voltage and a drain voltage of the first field effect transistor M1 tend to be consistent. The third resistor R3 has two functions. The first one is a voltage division function. The third resistor R3 is far larger than the series resistor obtained after the first field effect transistor M1 is turned on, so that the input voltage Vin of the charging port completely falls on the node c, to maintain a voltage difference between the source of the seventh field effect transistor M7 and the gate of the seventh field effect transistor M7 to be 0, and ensure that the seventh field effect transistor M7 is turned off. The second one is a current limiting function, to protect the first field effect transistor M1 from being damaged by the high current.

The voltage-regulator diode assembly includes n voltage-regulator diodes. The $1^{st}$ voltage-regulator diode D01 to the $n^{th}$ voltage-regulator diode D0*n* are sequentially connected in series. The positive electrode of the $i^{th}$ voltage-regulator diode D0*i* and the negative electrode of the $(i+1)^{th}$ voltage-regulator diode D0*i*+1 jointly form the $i^{th}$ adjustment voltage input end of the first detection component 031. When the $i^{th}$ adjustment voltage input end inputs a low level, and other adjustment voltage input ends are left unconnected, the first threshold is a sum of a clamping voltage of the first voltage-regulator diode D01 through a clamping voltage of the $i^{th}$ voltage-regulator diode D0*i*, which implements adjustment of the first threshold, that is, adjustment of a threshold for high-voltage direct current protection.

In Embodiment 1 of this application, a first detection circuit, a first discharge circuit, a second detection voltage, and a switch circuit are included. The first detection circuit generates a first detection voltage based on a peak voltage of an input voltage. The first discharge circuit discharges the peak voltage based on the first detection voltage. The second detection circuit generates a second detection voltage when the input voltage is greater than a first threshold. The switch circuit disconnects the input voltage based on the second detection voltage to protect a functional chip. This implements not only protection against an ESD and EOS peak voltage, but also protection against a high-voltage direct current. The protection against the peak voltage and the protection against the high-voltage direct current are not mutually limited, which implements protection against impact of electrical over-stress in various forms, and improves reliability of the charging port protection apparatus.

Embodiment 2

Figure 4:
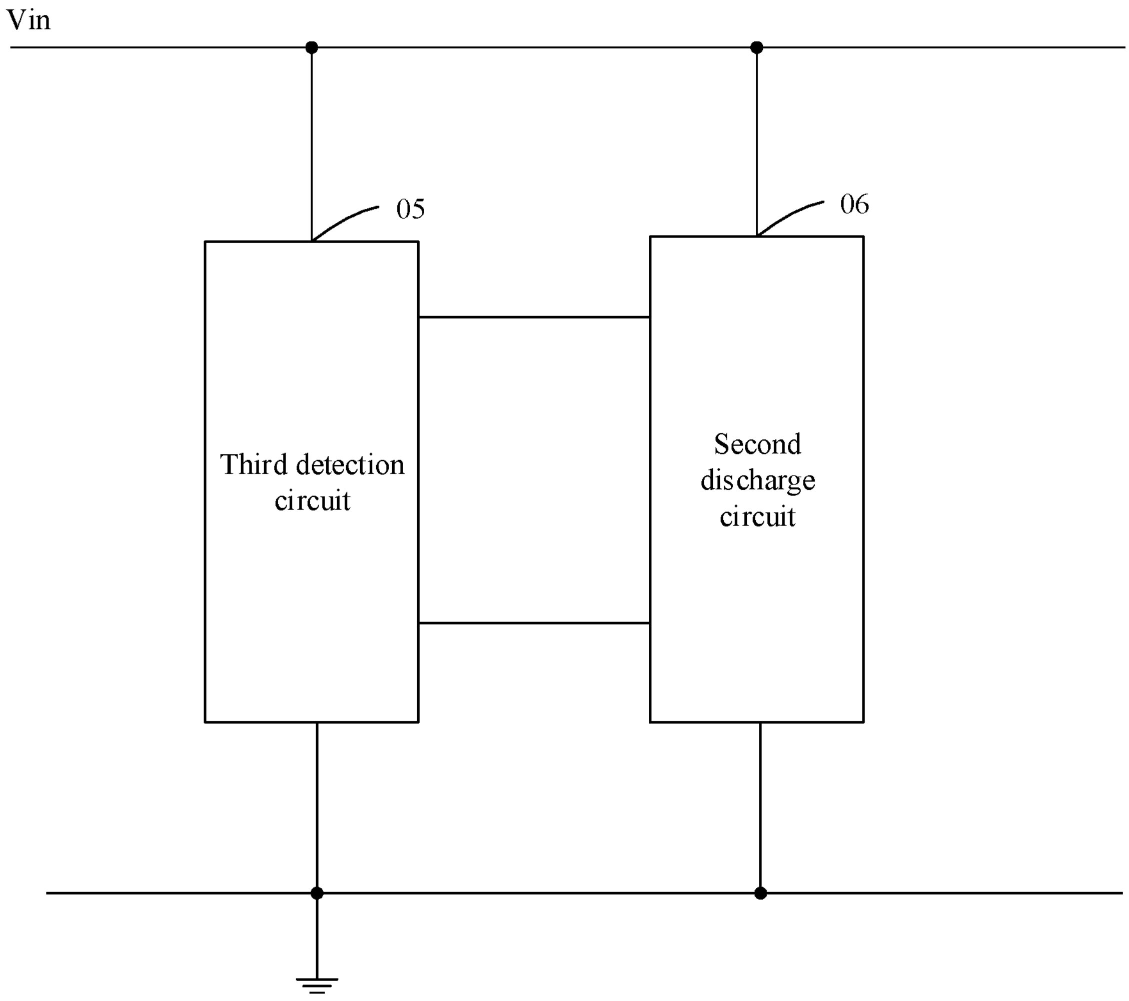
FIG. 4 is a schematic module diagram of a charging port protection apparatus according to Embodiment 2 of this application.

FIG. 4 shows a module structure of a charging port protection apparatus according to Embodiment 2 of the present invention, and for convenience of description, only a part related to Embodiment 2 of the present invention is shown. Specific descriptions are as follows:

The charging port protection apparatus includes a third detection circuit 05 and a second discharge circuit 06.

The third detection circuit 05 is configured to generate a fourth detection voltage when electrical over-stress of an input voltage is greater than a second threshold, or generate the fourth detection voltage based on a feedback voltage. The second discharge circuit 06 is connected to the third detection circuit 05, and is configured to discharge the electrical over-stress of the input voltage based on the fourth detection voltage, and generate the feedback voltage based on the discharge of the electrical over-stress.

The electrical over-stress includes ESD, EOS and a high-voltage direct current.

Specifically, the second discharge circuit 06 is further connected to a functional chip, and is specifically configured to discharge the electrical over-stress of the input voltage based on the fourth detection voltage to protect the functional chip 00, and generate the feedback voltage based on the discharge of the electrical over-stress.

Figure 5:
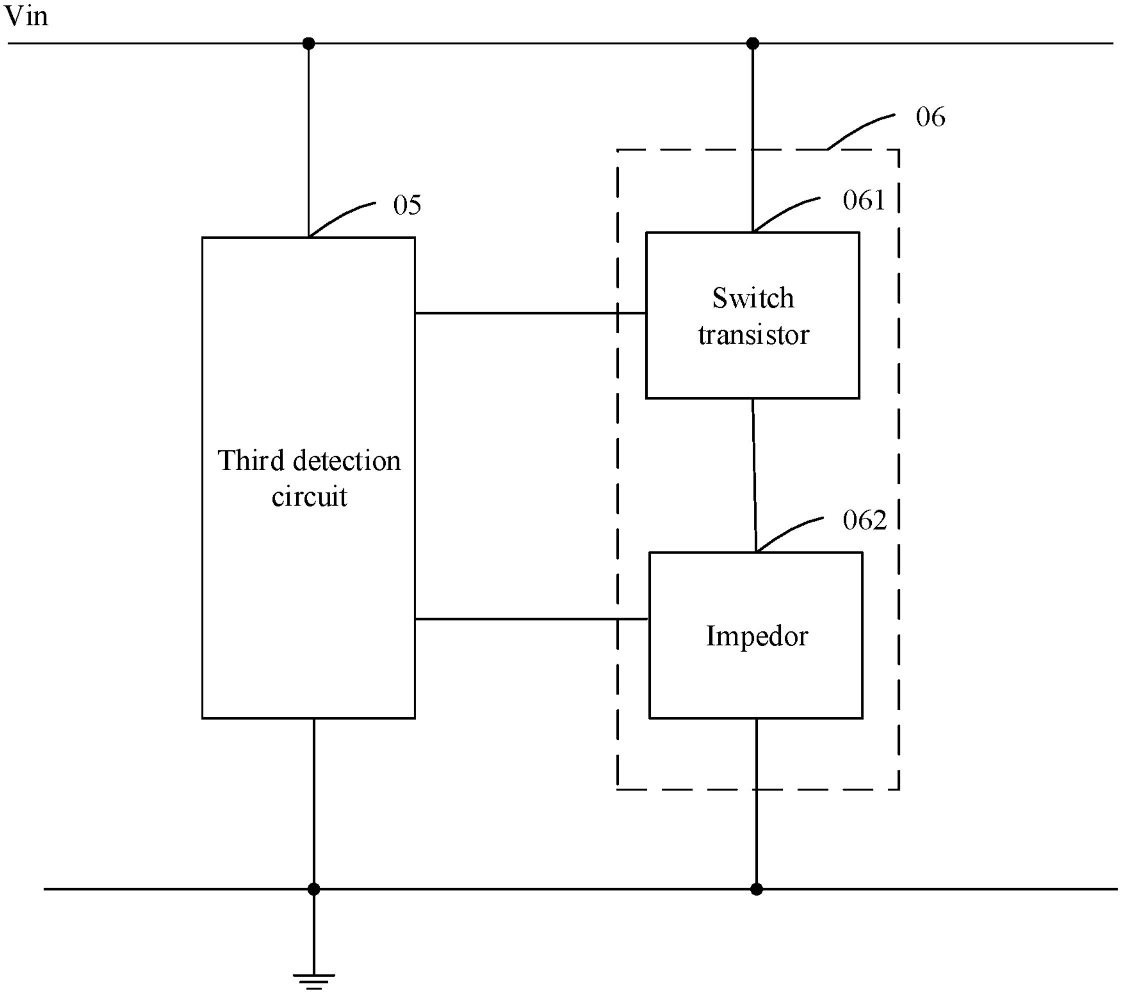
FIG. 5 is a schematic module diagram of a second discharge circuit of a charging port protection apparatus according to Embodiment 2 of this application.

As shown in FIG. 5, the second discharge circuit 06 includes a switch transistor 061 and an impedor 062.

A control end of the switch transistor 061 is a third detection voltage input end of the second discharge circuit 06. An input end of the switch transistor 061 is an input voltage input end of the second discharge circuit 06. An output end of the switch transistor 061 and a first end of the impedor 062 jointly form a feedback voltage output end of the second discharge circuit 06. A second end of the impedor 062 is connected to a power ground.

Figure 6:
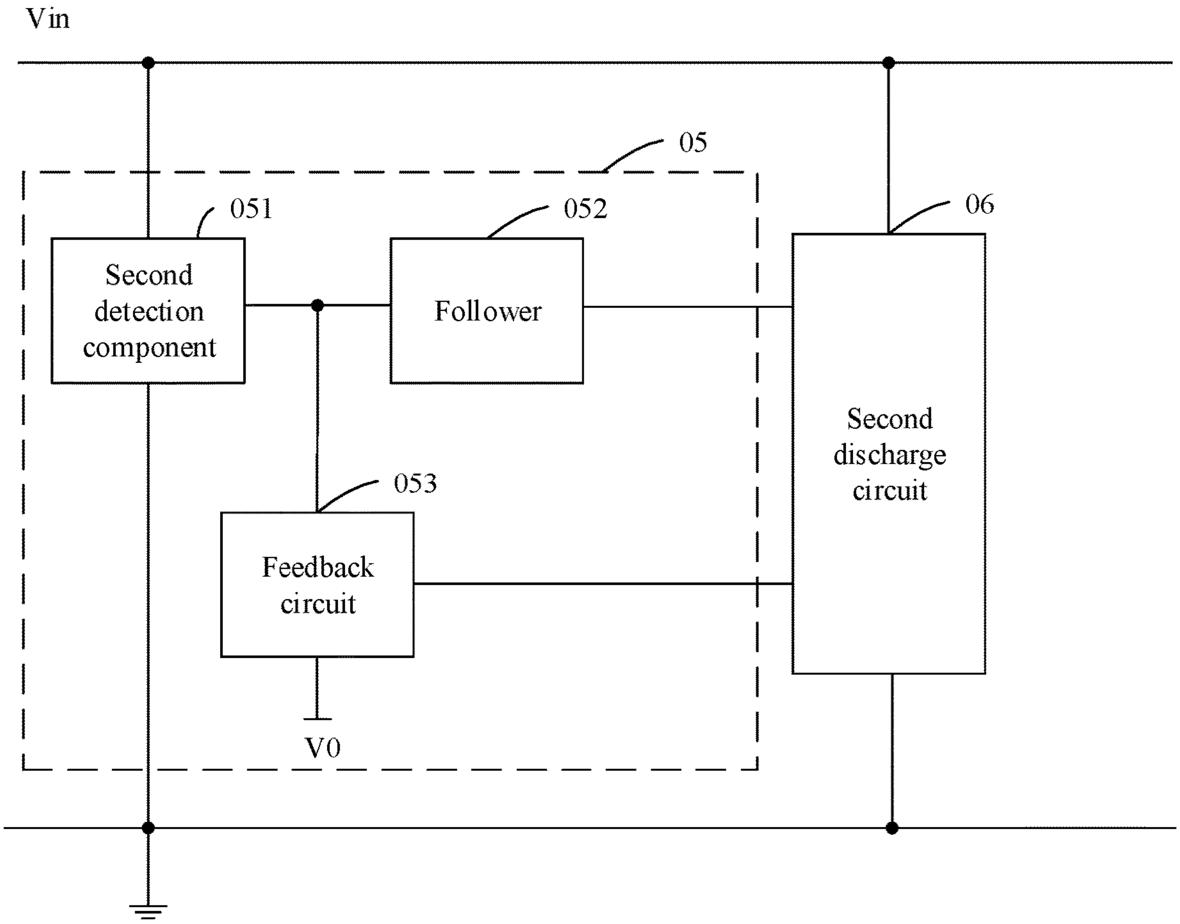
FIG. 6 is a schematic module diagram of a third detection circuit of a charging port protection apparatus according to Embodiment 2 of this application.

As shown in FIG. 6, the third detection circuit 05 includes a second detection component 051, a follower 052, and a feedback circuit 053.

The second detection component 051 is connected to the second discharge circuit 06, and is configured to generate a fifth detection voltage when the electrical over-stress of the input voltage is greater than a second threshold. The follower 052 is connected to the second detection component 051 and the second discharge circuit 06, and is configured to follow the fifth detection voltage and a first voltage to generate the fourth detection voltage. The feedback circuit 053 is connected to the second discharge circuit 06, the second detection component 051, and the follower 052, and is configured to connect the first voltage based on the feedback voltage.

Figure 7:
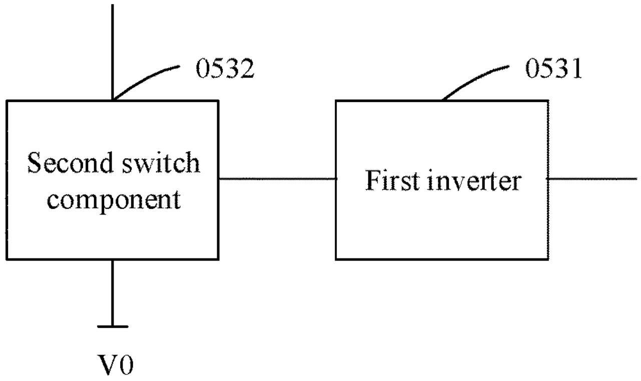
FIG. 7 is a schematic module diagram of a feedback circuit of a charging port protection apparatus according to Embodiment 2 of this application.

As shown in FIG. 7, the feedback circuit 053 includes a first inverter 0531 and a second switch component 0532.

The first inverter 0531 is connected to the second discharge circuit 06, and is configured to invert a phase of the feedback voltage. The second switch component 0532 is connected to the second detection component 051, the first inverter 0531, and the follower 052, and is configured to connect the first voltage based on the phase-inverted feedback voltage.

Specifically, the first inverter 0531 may be an inverter chip, or may include a field effect transistor and a resistor element.

Figure 8:
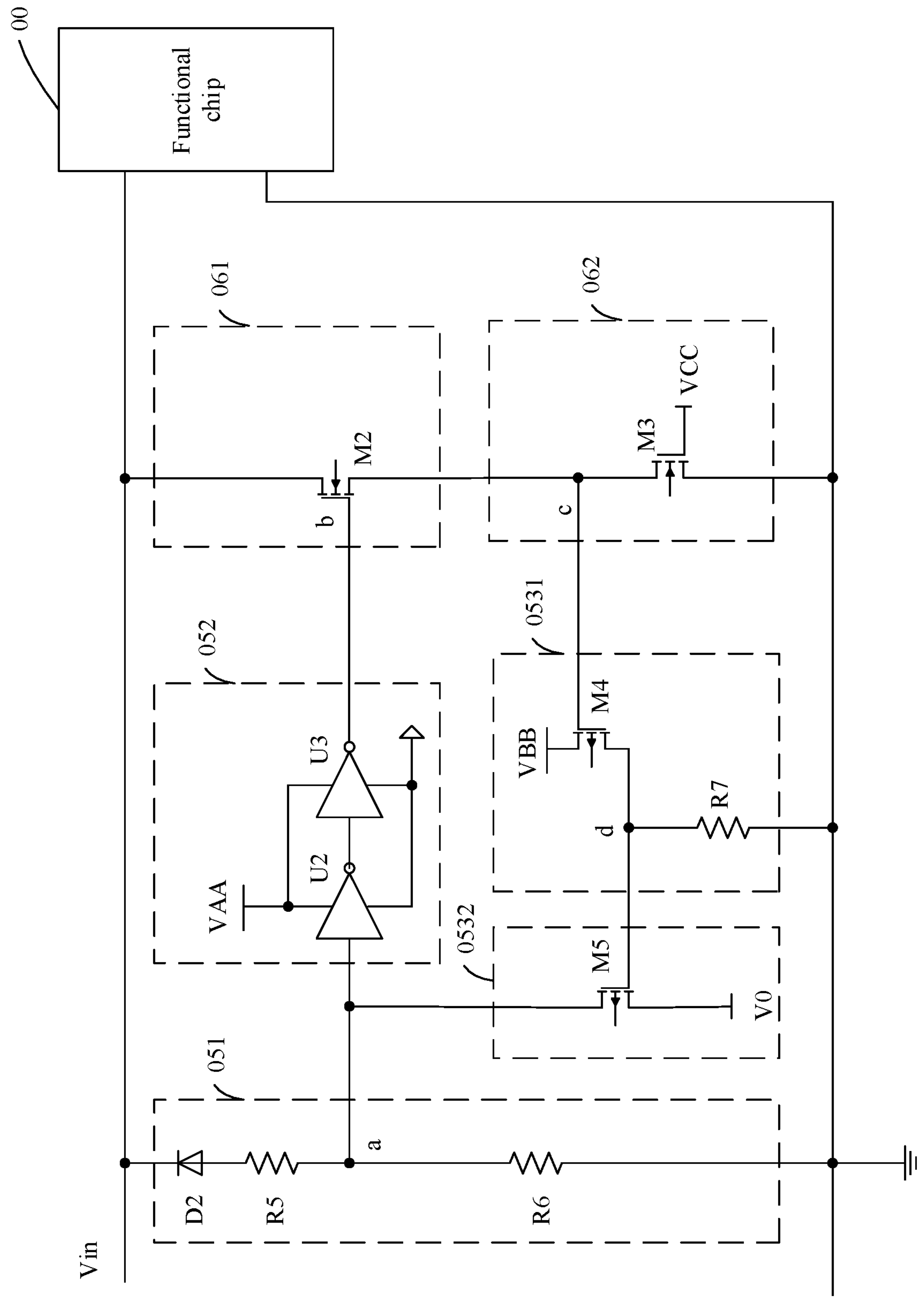
FIG. 8 is a diagram of an example circuit structure of a charging port protection apparatus according to Embodiment 2 of this application.
Figure 9:
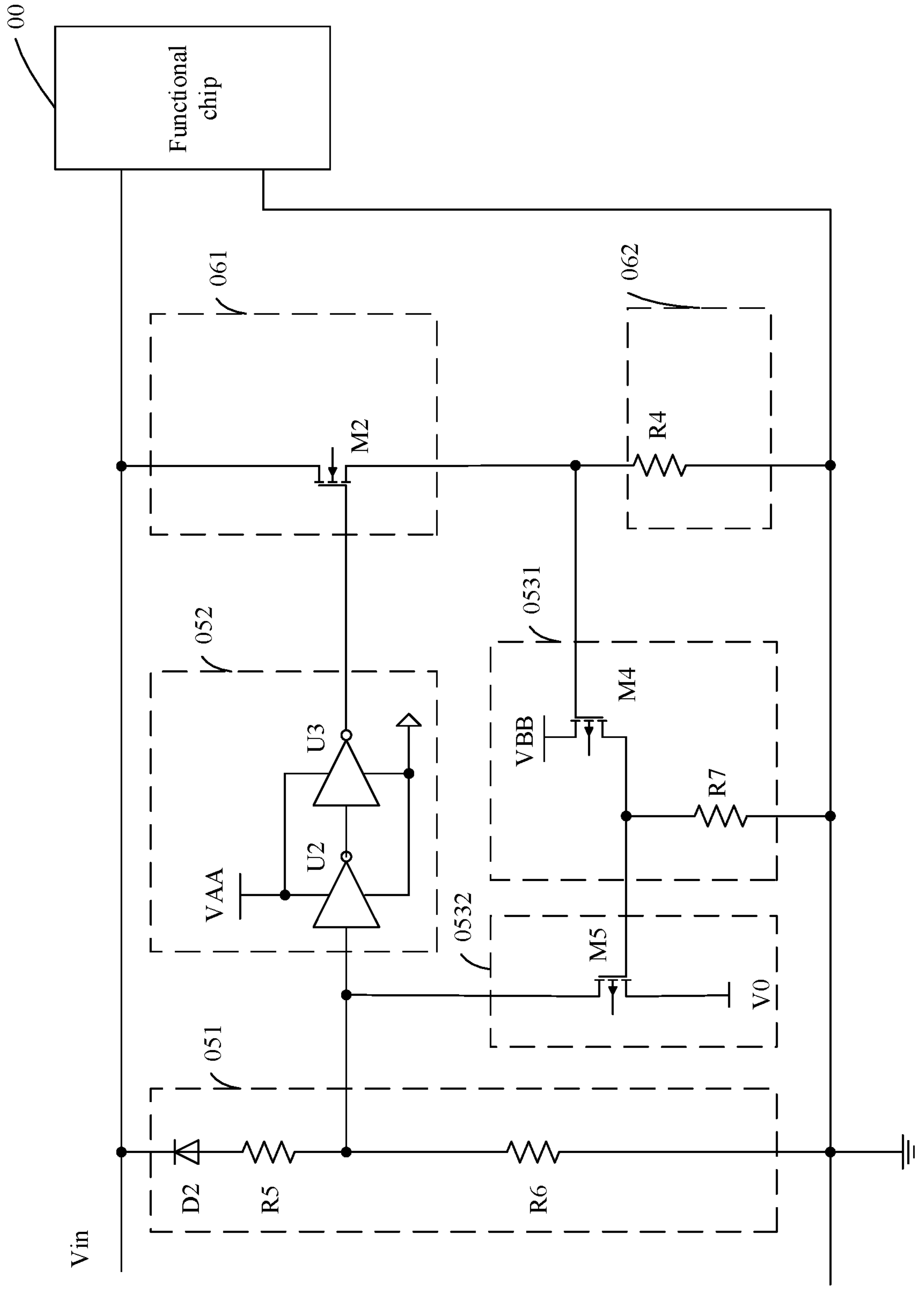
FIG. 9 is a diagram of another example circuit structure of a charging port protection apparatus according to Embodiment 2 of this application.

FIG. 8 shows an example circuit structure of a charging port protection apparatus according to an embodiment of the present invention, and FIG. 9 shows another example circuit structure of a charging port protection apparatus according to an embodiment of the present invention. For convenience of description, only a part related to embodiments of the present invention is shown. Specific descriptions are as follows:

The switch transistor 061 is a second field effect transistor M2, and the impedor 062 is a third field effect transistor M3 or a fourth resistor R4. A gate of the second field effect transistor M2 is a control end of the switch transistor 061. A drain of the second field effect transistor M2 is an input end of the switch transistor 061. A source of the second field effect transistor M2 is an output end of the switch transistor 061. A drain of the third field effect transistor M3 is the first end of the impedor 062. A source of the third field effect transistor M3 is the second end of the impedor 062. A gate of the third field effect transistor M3 is connected to a third power supply VCC.

The second detection component 051 includes a second voltage-regulator diode D2, a fifth resistor R5, and a sixth resistor R6.

A negative electrode of the second voltage-regulator diode D2 is an input voltage input end of the second detection component 051. A positive electrode of the second voltage-regulator diode D2 is connected to a first end of the fifth resistor R5. A second end of the fifth resistor R5 and a first end of the sixth resistor R6 jointly form a fifth detection voltage output end of the second detection component 051. A second end of the sixth resistor R6 is connected to a power ground.

The follower 052 includes a second inverter U2 and a third inverter U3.

An input end of the second inverter U1 is an input end of the follower 052. An output end of the second inverter U1 is connected to an input end of the third inverter U3. An output end of the third inverter U3 is an output end of the follower 052. A power supply end of the second inverter U2 and a power supply end of the third inverter U3 are jointly connected to a first power supply VAA. A grounding end of the second inverter U2 and a grounding end of the third inverter U3 are jointly connected to the power ground.

The first inverter 0531 includes a fourth field effect transistor M4 and a seventh resistor R7.

A gate of the fourth field effect transistor M4 is a feedback voltage input end of the first inverter 053. A source of the fourth field effect transistor M4 is connected to a second power supply VBB. A drain of the fourth field effect transistor M4 and a first end of the seventh resistor R7 jointly form an output end of the first inverter 053. A second end of the seventh resistor R7 is connected to the power ground.

The second switch component 0532 includes a fifth field effect transistor M5.

A gate of the fifth field effect transistor M5 is a feedback voltage input end of the second switch component 054. A source of the fifth field effect transistor M5 inputs a first voltage. A drain of the fifth field effect transistor M5 is a first voltage output end of the second switch component 054.

The present invention further provides a terminal, including the foregoing charging port protection apparatus.

What is shown in FIG. 8 and FIG. 9 is further described with reference to a working principle.

The second field effect transistor M2 and the third field effect transistor M3 may be NMOS transistors, and therefore have a strong capability of discharging a high current. The fourth field effect transistor M4 and the fifth field effect transistor M5 may be PMOS transistors.

The second voltage-regulator diode D2, the fifth resistor R5, and the sixth resistor R6 form a circuit for detecting electrical over-stress of the input voltage. When the input voltage Vin of the charging port is less than a clamping voltage of the second voltage-regulator diode D2, that is, when there is no electrical over-stress, the second voltage-regulator diode D2 is turned off. In this case, a node a is pulled down to the power ground by the sixth resistor R6, and a voltage on the node a is 0 V. After passing through the first inverter 053U2 and the second inverter U3, a voltage on a node b is also 0 V, the second field effect transistor M2 remains in an off state, and the input voltage Vin is input to the functional chip 00, which does not affect normal working of the functional chip 00. When the node c is pulled down to the power ground by the third field effect transistor M3, the fourth field effect transistor M4 is turned on. When a node d is charged to a voltage of the second power supply VBB, the fifth field effect transistor M5 is turned off.

When the electrical over-stress occurs on the input voltage of the charging port, the input voltage Vin of the charging port is greater than the clamping voltage of the second voltage-regulator diode D2, and the second voltage-regulator diode D2 is turned on. In this case, the fifth resistor R5 and the sixth resistor R6 have two functions. The first one is a current limiting function to protect the second voltage-regulator diode D2 from being burnt by a high current. The second one is a voltage division function. Because the sixth resistor R6 is far larger than the fifth resistor R5, a voltage difference ΔV between the input voltage Vin and the clamping voltage of the second voltage-regulator diode D2 mainly falls on the sixth resistor R6. When a voltage Va (that is, the voltage difference ΔV) of the node a is greater than a turnover voltage of the second inverter U2, a voltage Vb is charged to a high level, and the second field effect transistor M2 is turned on and discharges, together with the third field effect transistor M3, a high current caused by the electrical over-stress of the input voltage. Because of the high current on the third field effect transistor M3, the voltage of the node c increases, so that the fourth field effect transistor M4 is turned off, the node d is pulled down to the power ground by the seventh resistor R7, the fifth field effect transistor M5 is turned on, the node a is balanced at the first voltage V0, and a feedback loop (including the first inverter 053 and the second switch component 054) controls the second field effect transistor M2 to be stably turned on, to clamp the electrical over-stress of the input voltage of the charging port to a safe voltage range.

In Embodiment 2 of this application, a third detection circuit and a second discharge circuit are included. The third detection circuit generates a fourth detection voltage when electrical over-stress of an input voltage is greater than a second threshold, or generates the fourth detection voltage based on a feedback voltage. The second discharge circuit discharges the electrical over-stress of the input voltage based on the fourth detection voltage to protect the functional chip, and generates the feedback voltage based on the discharge of the electrical over-stress. This can implement protection against the electrical over-stress including ESD, EOS, and a high-voltage direct current. The protection against an ESD and EOS peak voltage and the protection against the high-voltage direct current are not mutually limited, which implements protection against impact of the electrical over-stress in various forms, and improves reliability of the charging port protection apparatus.

In the foregoing embodiments, the descriptions of all embodiments have respective focuses. For a part that is not described or recorded in detail in an embodiment, refer to related descriptions in other embodiments.

In embodiments provided in this application, it should be understood that the disclosed apparatus/terminal may be implemented in other manners. For example, the described apparatus/terminal embodiment is merely an example. For example, division into the components, circuits, modules or units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

The foregoing embodiments are merely intended to describe the technical solutions of this application, but are not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application, and these modifications and replacements shall fall within the protection scope of this application.

What is claimed is:

1. A charging port protection apparatus comprising:

a first detection circuit configured to generate a first detection voltage based on a peak voltage of an input voltage;

a first discharge circuit connected to the first detection circuit and configured to discharge the peak voltage based on the first detection voltage;

a second detection circuit connected to the first detection circuit and the first discharge circuit and configured to generate a second detection voltage in response to the input voltage being greater than a first threshold; and a switch circuit connected to the first detection circuit, the first discharge circuit, and the second detection circuit and configured to disconnect the input voltage based on the second detection voltage.

2. The charging port protection apparatus according to claim 1, wherein the first detection circuit further comprises a first capacitor, a first resistor, and a first voltage-regulator diode, wherein a negative electrode of the first voltage-regulator diode is an input voltage input end of the first detection circuit, a positive electrode of the first voltage-regulator diode is connected to a first end of the first capacitor, a second end of the first capacitor and a first end of the first resistor are first detection voltage output ends of the first detection circuit, and a second end of the first resistor is connected to a power ground.

3. The charging port protection apparatus according to claim 1, wherein the second detection circuit comprises:

a first detection component connected to the first detection circuit, the first discharge circuit, and the switch circuit and configured to generate a third detection voltage in response to the input voltage being greater than the first threshold; and a first switch component connected to the detection component, the first detection circuit, the first discharge circuit, and the switch circuit and configured to generate the second detection voltage based on the third detection voltage.

4. The charging port protection apparatus according to claim 3, wherein the first detection component comprises a voltage-regulator diode assembly and a second resistor, wherein a first end of the second resistor is an input voltage input end of the first detection component, a second end of the second resistor and a negative electrode of the voltage-regulator diode assembly are third detection voltage output ends of the first detection component, and a positive electrode of the voltage-regulator diode assembly is connected to a power ground.

5. The charging port protection apparatus according to claim 3, wherein the first switch component comprises a first field effect transistor and a third resistor, wherein a gate of the first field effect transistor is a third detection voltage input end of the first switch component, a source of the first field effect transistor is an input voltage input end of the first switch component, and a first end of the third resistor and a drain of the first field effect transistor jointly form a second detection voltage output end of the first switch component.

6. A terminal comprising a charging port protection apparatus, wherein the charging port protection apparatus comprises:

a first detection circuit configured to generate a first detection voltage based on a peak voltage of an input voltage;

a first discharge circuit connected to the first detection circuit and configured to discharge the peak voltage based on the first detection voltage;

a second detection circuit connected to the first detection circuit and the first discharge circuit and configured to generate a second detection voltage in response to the input voltage being greater than a first threshold; and a switch circuit connected to the first detection circuit, the first discharge circuit and the second detection circuit and configured to disconnect the input voltage based on the second detection voltage.

* * * * *